US009628945B2

(12) United States Patent
Dow et al.

(10) Patent No.: US 9,628,945 B2
(45) Date of Patent: *Apr. 18, 2017

(54) LEADER AND FOLLOWER MANAGEMENT SYSTEM FOR WEARABLE DEVICES

(71) Applicant: International Business Machines Corporation, Armonk, NY (US)

(72) Inventors: Eli M. Dow, Wappinger Falls, NY (US); Joseph D. Harvey, Binghamton, NY (US); Thomas D. Fitzsimmons, Poughkeepsie, NY (US); Douglas E. Rohde, East Meadow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,243

(22) Filed: Oct. 7, 2015

(65) Prior Publication Data
US 2017/0006412 A1  Jan. 5, 2017

Related U.S. Application Data

(63) Continuation of application No. 14/754,756, filed on Jun. 30, 2015.

(51) Int. Cl.
*H04W 4/00* (2009.01)
*H04W 4/02* (2009.01)
(Continued)

(52) U.S. Cl.
CPC ............ *H04W 4/008* (2013.01); *H04L 63/08* (2013.01); *H04L 67/12* (2013.01); *H04L 67/22* (2013.01); *H04W 4/02* (2013.01); *H04W 76/02* (2013.01)

(58) Field of Classification Search
CPC ....... H04W 4/008; H04W 4/02; H04W 76/02; H04L 63/08; H04L 67/12; H04L 67/22
(Continued)

(56) References Cited

U.S. PATENT DOCUMENTS 8,472,120 B2  6/2013  Border et al.
8,862,055 B2  10/2014  Mirbaha et al.
(Continued)

FOREIGN PATENT DOCUMENTS

EP       2423900 A1    2/2012

OTHER PUBLICATIONS

Gillian, Nick; "Gesture Recognition Toolkit"; Wiki; Printed Feb. 25, 2015; pp. 1-4; <http://www.nickgillian.com/wiki/pmwiki.php?n=GRT.GestureRecognitionToolkit>.
(Continued)

*Primary Examiner* — Michael Mapa
(74) *Attorney, Agent, or Firm* — Edward J. Wixted, III

(57) ABSTRACT

A wearable computing device identifies a gesture made by the user of the wearable computing device. The wearable computing device sends an offer to a second wearable computing device, where the offer is to follow the user. The wearable computing device receives an indication of acceptance of the offer from the second wearable computing device, where the acceptance of the offer comprises an identified gesture made by the user of the second wearable computing device. The wearable computing device sends information related to at least the current location of the wearable computing device to the second wearable computing device.

9 Claims, 5 Drawing Sheets

(51) Int. Cl.
  *H04L 29/06*   (2006.01)
  *H04L 29/08*   (2006.01)
  *H04W 76/02*   (2009.01)

(58) Field of Classification Search
  USPC .................... 455/41.2, 418–420, 456.1–457
  See application file for complete search history.

(56) References Cited

U.S. PATENT DOCUMENTS

| | | | |
|---|---|---|---|
| 2004/0027336 A1* | 2/2004 | Ishii | B60R 25/102 345/169 |
| 2011/0001813 A1* | 1/2011 | Kim | G06K 9/00355 348/77 |
| 2012/0202428 A1 | 8/2012 | Mirbaha et al. | |
| 2014/0247282 A1* | 9/2014 | Beaurepaire | G06F 3/014 345/633 |
| 2015/0149924 A1* | 5/2015 | Tsai | G06F 3/017 715/748 |
| 2015/0192420 A1* | 7/2015 | Watters | G01C 21/34 701/410 |
| 2016/0134336 A1* | 5/2016 | Persson | H04W 8/005 455/456.1 |

OTHER PUBLICATIONS

"Simple-openni OpenNI library for Processing"; Printed Feb. 25, 2015; pp. 1-5; <https://code.google.com/p/simple-openni/>.
"Appendix P: List of IBM Patents or Patent Applications Treated as Related", Filed Oct. 7, 2015, pp. 1-2.
U.S. Appl. No. 14/754,756, filed Jun. 30, 2015; Entitled "Leader and Follower Management System for Wearable Devices".

\* cited by examiner

LEADER AND FOLLOWER MANAGEMENT SYSTEM FOR WEARABLE DEVICES

BACKGROUND OF THE INVENTION

The present invention relates generally to the field of wearable devices and more particularly to the use of wearable devices for tracking and following a group leader.

Wearable devices are used to track actions of users and to provide users with convenient access to information. Wearable devices are often used to track physiological data such as the body temperature or heart rate of the user, as well as information such as the current location of the user. Wearable devices are often configured to passively collect information as the user goes about their day without any direct interaction between the wearable device and the user.

SUMMARY

Embodiments of the invention disclose a method, computer program product, and computer system for initiating a following process between wearable computing devices. A wearable computing device identifies a gesture made by the user of the wearable computing device. The wearable computing device sends an offer to a second wearable computing device, where the offer is to follow the user. The wearable computing device receives an indication of acceptance of the offer from the second wearable computing device, where the acceptance of the offer comprises an identified gesture made by the user of the second wearable computing device. The wearable computing device sends information related to at least the current location of the wearable computing device to the second wearable computing device.

DETAILED DESCRIPTION

In general, embodiments of the present invention provide a leader management program and a follower management program for use on wearable computing devices for automatically identifying that a leader wishes to be followed, and sending information related to the leader to each of the followers.

In various embodiments, the wearable device of the invention is used to identify situations where a group leader, tour guide, or a person familiar with a specific area, herein referred to as "the "leader", wishes for at least one other person, herein referred to as "the "follower", to follow them. In various embodiments of the invention, the follower can be any person who wishes to receive information related to the current location of the leader, and information related to any points of interest identified by the leader. It should be appreciated that although an embodiment where one follower is currently following the leader is depicted in FIGS. 1-5, in other embodiments any number of followers may be following the leader.

Figure 1:
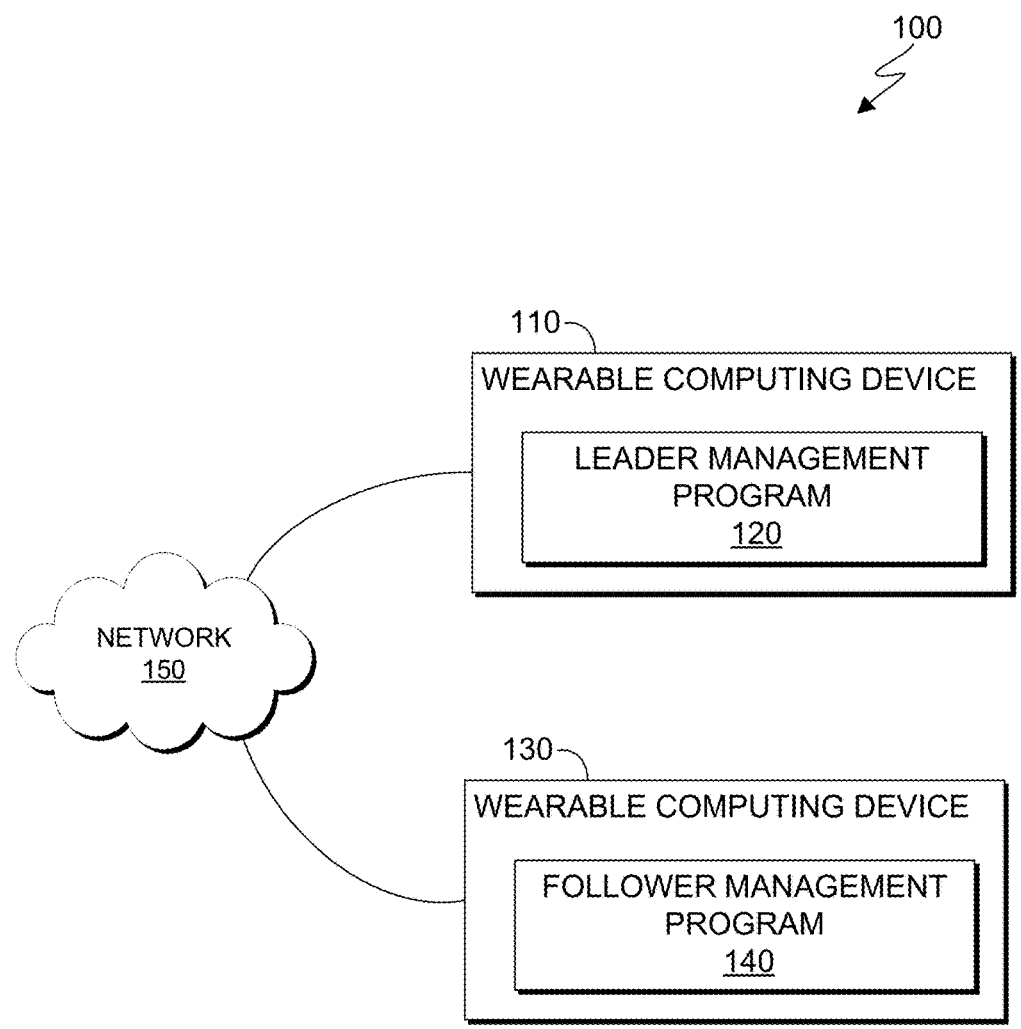
FIG. 1 is a block diagram depicting a computing environment including a first wearable computing device and a second wearable computing device, in accordance with an embodiment of the invention.

The present invention will now be described in detail with reference to the Figures. FIG. 1 is a functional block diagram illustrating a computing environment, generally designated 100, in accordance with one embodiment of the present invention. Computing environment 100 includes wearable computing devices 110 and 130 and network 150. In the depicted embodiment, wearable computing device 110 is intended to be used by the leader, and includes leader management program 120. Additionally, wearable computing device 130 is intended to be used by the follower, and includes follower management program 140.

In one embodiment, computing environment 100 is a physical area which includes devices which are in close physical proximity to each other. For example, in one embodiment, computing environment 100 includes any computing devices which are within 100 meters of wearable computing device 110. In this embodiment, nearby devices are identified using Bluetooth, WiFi, or any other wireless communication means. In another embodiment, the location of nearby devices is identified using information such as global positioning system (GPS) data. In other embodiments, computing environment 100 is configured to include any computing devices which are included in a network such as a virtual private network (VPN), regardless of the physical location of any device.

Figure 5:
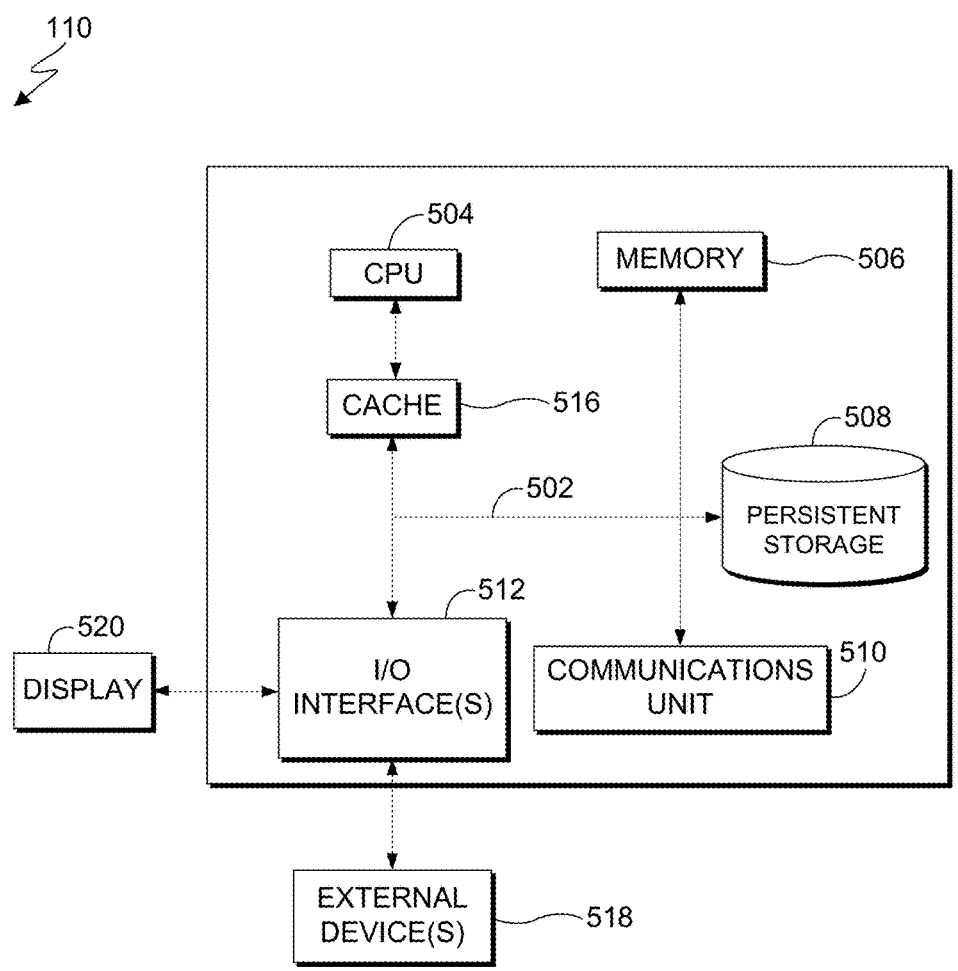
FIG. 5 is a block diagram illustrating the components included in the first and second wearable computing devices of FIG. 1, in accordance with an embodiment of the invention.

In various embodiments of the invention, wearable computing devices 110 and 130 can be watches, pairs of glasses, rings, bracelets, garments such as jackets or shirts, or any other wearable item designed to incorporate the various components depicted in FIG. 5. In general, wearable computing devices 110 and 130 can be any devices which can be worn by a user and are capable of executing leader management program 120, executing follower management program 140, and communicating with network 150. Wearable computing devices 110 and 130 may include internal and external hardware components, as depicted and described in further detail with respect to FIG. 5.

In various embodiments, wearable computing devices 110 and 130 can include additional hardware components which facilitate interactions between wearable computing devices 110 and 130 and other users or electronic devices. For example, in one embodiment, wearable computing devices 110 and 130 include a GPS device, a touchscreen input device, a Bluetooth communication device, an input/output (I/O) port such as a Universal Serial Bus (USB) port, and a wireless communication device incorporating a code division multiple access (CDMA) chipset or subscriber identification module (SIM) card. In general, the purpose of these components are to facilitate communication between wearable computing device 110, wearable computing device 130, and network 150.

Leader management program 120 is a computer program which identifies a "follow me" gesture made by the user, authenticates the request for the follower to follow the leader, and sends information related to the location of the leader and the location of one or more identified points of interest (POIs) to each of the followers.

Follower management program 140 is a computer program which identifies a gesture or verbal indication made by the follower that the follower wants to follow the leader, sends authentication information to leader management program 120, and receives information related to the current location of the leader and the location of one or more POIs identified by the leader.

It should be appreciated that in embodiments of the invention both leader management program 120 and follower management program 140 can be present on each wearable computing device present within computing environment 100. Additionally, in embodiments where more than one follower is present, additional wearable computing devices are present within computing environment 100.

In the depicted embodiment, leader management program 120 and follower management program 140 are located on wearable computing devices 110 and 130 respectively. However, in other embodiments, leader management program 120 and follower management program 140 may be located externally and accessed through a communication network such as network 150. Network 150 can be, for example, a local area network (LAN), a wide area network (WAN) such as the Internet, the public switched telephone network (PSTN), or a combination, and may include wired, wireless, fiber optic or any other connection known in the art. In general, network 150 can be any combination of connections and protocols that will support communications between wearable computing device 110, leader management program 120, wearable computing device 130, and follower management program 140 in accordance with a desired embodiment of the invention.

Figure 2:
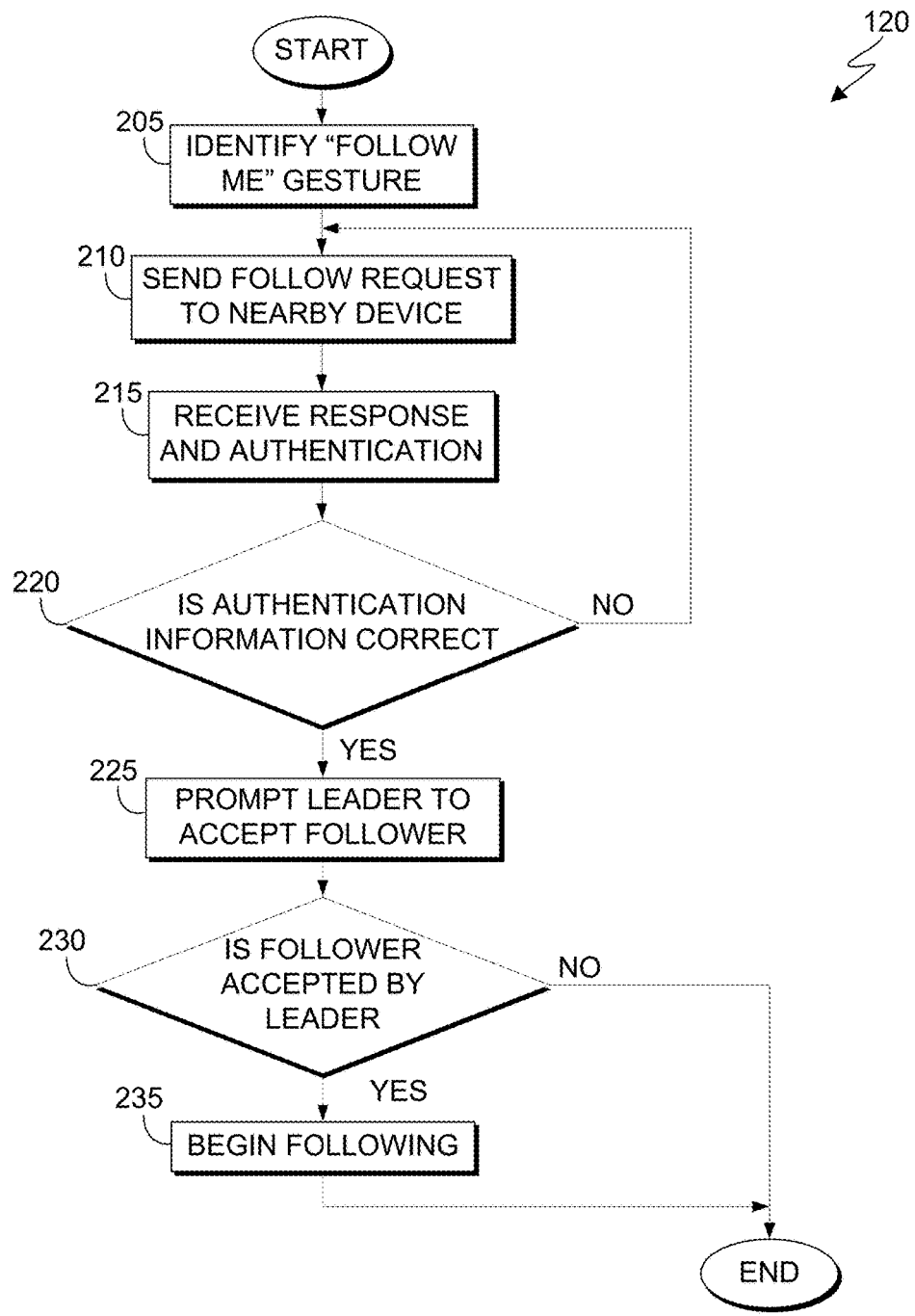
FIG. 2 is a flowchart depicting the operational steps of a leader management program being executed by the first wearable computing device of FIG. 1, in accordance with an embodiment of the invention.

FIG. 2 is a flowchart depicting the operational steps included in leader management program 120 for identifying a "follow me" gesture made by a leader, authenticating the request for each of the followers to follow the leader, and sending information related to the location of the leader and the location of one or more identified points of interest (POIs) to each of the followers.

In step 205, leader management program 120 identifies a "follow me" gesture or verbal indication made by the leader. In one embodiment, a "follow me" gesture can be a gesture made by the leader with their hands, such as waving towards themselves, which is detected by a video camera included within wearable computing device 110. In other embodiments, a "follow me" gesture can be a physical indication such as a wave, pointing, a nod of the user's head, or any other physical gesture made by the user. In another embodiment, the "follow me" gesture is a verbal indication made by the user that the user would like another person to follow them, which is detected by a microphone included within wearable computing device 110. In these embodiments, leader management program 120 can be configured to passively listen for a key word or phrase such as "follow me", "look at this", "over this way", or any other verbal indication that the leader wants to point something out to another person.

In a preferred embodiment, the "follow me" gesture is configured to be an action which the leader takes naturally when they want another person to follow them, without having to consciously think about it. It should be appreciated that the selection of the "follow me" gesture can differ based on the identity of the leader and that different "follow me" gestures may work more or less effectively based on the identity of the leader. In some embodiments, the leader selects a specific gesture such as a wave or a nod of the leader's head which serves as the "follow me" gesture in a specific embodiment.

In step 210, leader management program 120 sends a follow request to each additional wearable computing device present within computing environment 100. In the depicted embodiment, because only one follower is present within computing environment 100, a request to follow the leader is only sent to wearable computing device 130. In embodiments, where many wearable computing devices are present within computing environment 100, a separate request to follow is sent to each wearable computing device present within computing environment 100. In various embodiments, follow requests can be transmitted using any communication technology such as WiFi, Bluetooth, cellular data, or any other known method of transmitting data over a network. In one embodiment, Bluetooth technology is used to send a follow request to every wearable computing device present within computing environment 100 which is within range of wearable computing device 110 for receiving Bluetooth communications.

In some embodiments, wearable computing device 110 includes a blacklist of devices and users which are never permitted to follow the user of wearable computing device 110, and in these embodiments follow requests are not sent to the devices identified on the blacklist. In these embodiments, devices may be identified by, for example, a hostname, MAC address, IP address, telephone number, or another name or address unique to the device. In another embodiment, a camera included within wearable computing device 110 utilizes facial recognition software to identify the presence of a user which is included in the blacklist. In this embodiment, Bluetooth or another wireless communication technology is used to identify the wearable computing device corresponding to the user included in the blacklist. It should be appreciated that in some embodiments, different methods of identifying a specific device or user can be selected based on the details of that specific embodiment. For example, in an embodiment where wearable computing device 110 and wearable computing device 130 are connected via a WAN such as the internet, it may be impractical to utilize IP addresses for identifying specific devices due to the frequency with which IP addresses can change in WANs. In this embodiment, it may be determined that MAC addresses provide a more reliable means of identifying individual devices, and in this embodiment devices which are added to a blacklist are identified by their MAC addresses.

In some embodiments, many wearable computing devices may be present within computing environment 100, within close proximity to wearable computing device 110, such as when a tour group is within a crowded area of a city. In these embodiments, leader management program 120 may include a request for authentication information in the offer to follow. In general, the request for authentication information is meant to ensure that only followers who are familiar with the leader will be able to follow the leader. For example, the authentication information can be a password, provided to tourists upon joining a tour group, which is required to begin following a tour leader.

In some embodiments, wearable computing device 110 includes a whitelist of devices which are permitted to follow the user of wearable computing device 110 without providing authentication information. In these embodiments, the following request sent to devices identified on the whitelist in step 210 does not include a request for authentication information. In various embodiments, whitelisted devices are devices owned by close friends and family members of the user of wearable computing device 110. In these embodiments, devices may be identified by, for example, a hostname, MAC address, IP address, telephone number, or another name or address unique to the device. It should be appreciated that in some embodiments, different methods of identifying a specific device can be selected based on the details of that specific embodiment. For example, in an embodiment where wearable computing device 110 and wearable computing device 130 are connected via a WAN such as the Internet, it may be impractical to utilize IP addresses for identifying specific devices due to the frequency with which IP addresses can change in WANs. In this embodiment, it may be determined that MAC addresses provide a more reliable means of identifying individual devices, and in this embodiment devices which are added to a whitelist are identified by their MAC addresses.

In step 215, leader management program 120 receives a response to the follow request and authentication information, if required, from each of the followers. In general, a response to a follow request is either an indication that the user of wearable computing device 130 accepts or rejects the request to follow sent by the user of wearable computing device 110 in step 210. In various embodiments, the user of wearable computing device 130 selects how to respond to the follow request either by making a gesture, such as a thumbs up gesture or an "A-OK" gesture, identifying a verbal command made by the user of wearable computing device 130, or by the user nodding their head in response to a dialog displayed by wearable computing device 130. In embodiments where a request for authentication information is included in the follow request sent in step 210, authentication information, such as a password, is included in the response to the follow request sent by leader management program 120.

In another embodiment, the authentication information provided by the user of wearable computing device 130 is the name or some piece of information which identifies the user of wearable computing device 130. In this embodiment, this information is used by the leader to determine whether or not the leader wants the user of wearable computing device 130 to be a follower.

In decision step 220, leader management program 120 determines, if required, whether the authentication information received in step 215 is correct. In various embodiments, leader management program 120 determines whether or not the authentication information received is correct by comparing the received authentication information to a stored correct answer or correct set of authentication information. In other embodiments, where the authentication information includes the name or identity of the user of wearable computing device 130, the leader manually identifies whether or not the user of wearable computing device 130 is allowed to be a follower.

If leader management program 120 determines that the authentication information received in step 215 is not correct (decision 220, no branch), then leader management program 120 proceeds to send a new follow request to the nearby device in step 210. In some embodiments, a fixed number of follow requests can be sent to wearable computing device 130 before wearable computing device 130 is automatically blacklisted. In these embodiments, the limit on the number of follow requests prevents the user of wearable computing device 130 from guessing the authentication information, and provides additional security.

If leader management program 120 determines that the authentication information received in step 215 is correct (decision 220, yes branch), then leader management program 120 proceeds to prompt the leader to accept the follower in step 225.

In step 225, leader management program 120 prompts the leader to accept the request to follow received from wearable computing device 130 and receives a selection of whether or not the follower is accepted by the leader. In embodiments where the authentication information includes the identity of the user of wearable computing device 130, the leader selects whether or not the user of wearable computing device 130 is permitted to follow the leader.

In decision step 230, leader management program 120 determines if the follower was accepted by the leader in step 225. If the request received from wearable computing device 130 in step 215 is accepted by the leader (decision 230, yes branch), then leader management program 120 proceeds to begin the following process in step 235. If the request received from wearable computing device 130 in step 215 is not accepted by the leader (decision 230, no branch), then leader management program 120 ends.

In embodiments where leader management program 120 maintains a blacklist of devices which are not permitted to follow the user of wearable computing device 110, leader management program 120 may receive a selection to blacklist the user of wearable computing device 130. In these embodiments, leader management program 120 adds any known MAC address, telephone number, or other identifying address of wearable computing device 130 to a blacklist of devices which are not permitted to follow the user of wearable computing device 110 and will not be sent follow requests in the future. In other embodiments, leader management program 120 adds the identity of the user of wearable computing device 130 to the blacklist, and leader management program 120 automatically rejects any requests to follow received from the user of wearable computing device 130.

In step 235, leader management program 120 begins allowing the user of wearable computing device 130 to follow the user of wearable computing device 110. In one embodiment, the process of the user of wearable computing device 130 following the user of wearable computing device 110 includes leader management program 120 sending information such as the current location of wearable computing device 110 and the location of any identified points of interest to wearable computing device 130. The process of the user of wearable computing device 130 following the user of wearable computing device 110 is depicted and described in greater detail with respect to FIG. 4.

Figure 3:
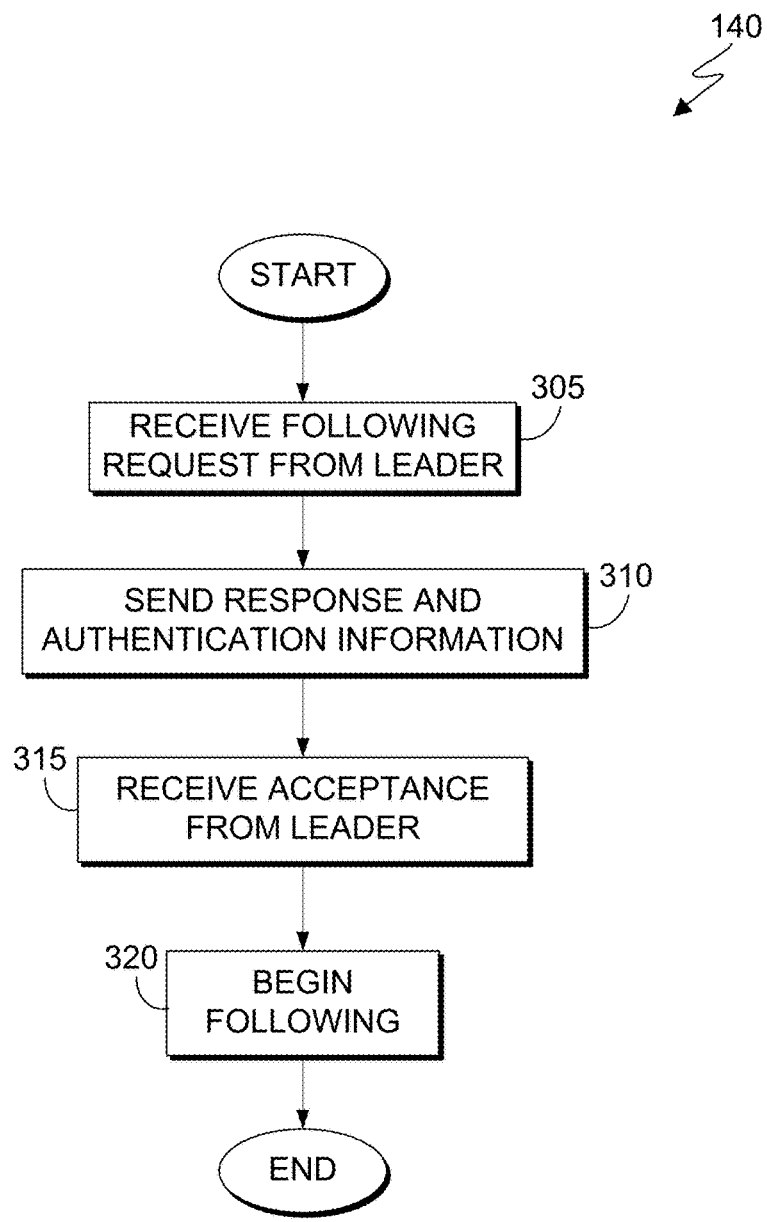
FIG. 3 is a flowchart depicting the operational steps of a follower management program being executed by the second wearable computing device of FIG. 1, in accordance with an embodiment of the invention.

FIG. 3 is a flowchart depicting the operational steps of follower management program 140 executing on wearable computing device 130 for allowing the user of wearable computing device 130 to follow the user of wearable computing device 110, in accordance with an embodiment of the invention. In some embodiments, follower management program 140 facilitates the user of wearable computing device 130 to receive a follow request, respond to the follow request, and provide authentication information to the user of wearable computing device 110.

In step 305, follower management program 140 receives a follow request from the user of wearable computing device 110 to follow the user of wearable computing device 110. In one embodiment, a request for the user of wearable computing device 130 to follow the user of wearable computing device 110 includes the identity of the user of wearable computing device 110. In other embodiments, the follow request includes a portion of text which describes the purpose of the follow request, such as a tour group number, the name of a point of interest which the leader intends to point out to the follower, or the destination to which the follower is following the leader.

In some embodiments, where the users of wearable computing device 110 and 130 are located sufficiently close to each other, wearable computing device 130 identifies the "follow me" gesture made by the leader using a camera included within wearable computing device 130. In these embodiments, wearable computing device 130 sends a request to wearable computing device 110 which indicates that the user of wearable computing device 130 wishes to follow the leader. In these embodiments, the request is transmitted to wearable computing device 110 using a wireless communication technology such as Bluetooth or WiFi. Upon receiving the request from wearable computing device 130, wearable computing device 110 sends a follow request to wearable computing device 130 (FIG. 2, step 210).

In step 310, follower management program 140 sends a response to the following request received in step 305 and authentication information provided by the user of wearable computing device 130 to wearable computing device 110 for verification. In various embodiments, this authentication information can be a password which is known to both the leader and the follower, or any other information which is known by both the leader and the follower.

In another embodiment, the authentication information provided by the user of wearable computing device 130 is the name or some piece of information which identifies the user of wearable computing device 130. In this embodiment, this information is used by the leader to determine whether or not the leader wants the user of wearable computing device 130 to be able to follow them.

In some embodiments, the user of wearable computing device 130 receives a request to follow the user of wearable computing device 110 which they did not wish to receive, and in these embodiments, the user of wearable computing device 130 selects to reject the follow request. In some embodiments, rejecting the follow request is accomplished by wearable computing device 130 not responding to the follow request, while in other embodiments rejecting the follow request is accomplished by wearable computing device 130 sending an indication to wearable computing device 110 that the follow request has been rejected by the user of wearable computing device 130.

In various embodiments, the user of wearable computing device 130 selects how to respond to the follow request either by making a gesture such as a thumbs up gesture or an "A-OK" gesture, identifying a verbal command made by the user of wearable computing device 130, or by the user nodding their head in response to a dialog displayed by wearable computing device 130.

It should be appreciated that in some embodiments, no authentication information is required by wearable computing device 110 in order for the user of wearable computing device 130 to follow the user of wearable computing device 110. In these embodiments, only a response to the following request received in step 305 is included in the response sent to wearable computing device 110 in step 310.

In step 315, follower management program 140 receives either acceptance or rejection of the response to the following request sent to wearable computing device 110 in step 310. If follower management program 140 receives acceptance of the response to the follow request sent to wearable computing device 110 in step 310 (decision step 315, yes branch), then follower management program 140 proceeds to begin the following process in step 320. If follower management program 140 receives rejection of response to the follow request sent to wearable computing device 110 in step 310 (decision step 315, no branch), then follower management program 140 ends.

In embodiments where the response to the follow request is rejected unintentionally by the user of wearable computing device 110, follower management program 140 can be restarted by the user of wearable computing device 110 re-sending a request to follow to wearable computing device 130. In some embodiments, the user of wearable computing device 110 rejects a response to a follow request if the follow request comes from a user who the leader did not intend to send a follow request to.

In step 320, follower management program 140 begins to follow the leader. In various embodiments, following the user of wearable computing device 110 includes receiving information related to the current location of the user of wearable computing device 110 ("the leader") as well as receiving information related to the location of one or more points of interest identified by the leader. The process of a follower following a leader is depicted and described in greater detail with respect to FIG. 4.

Figure 4:
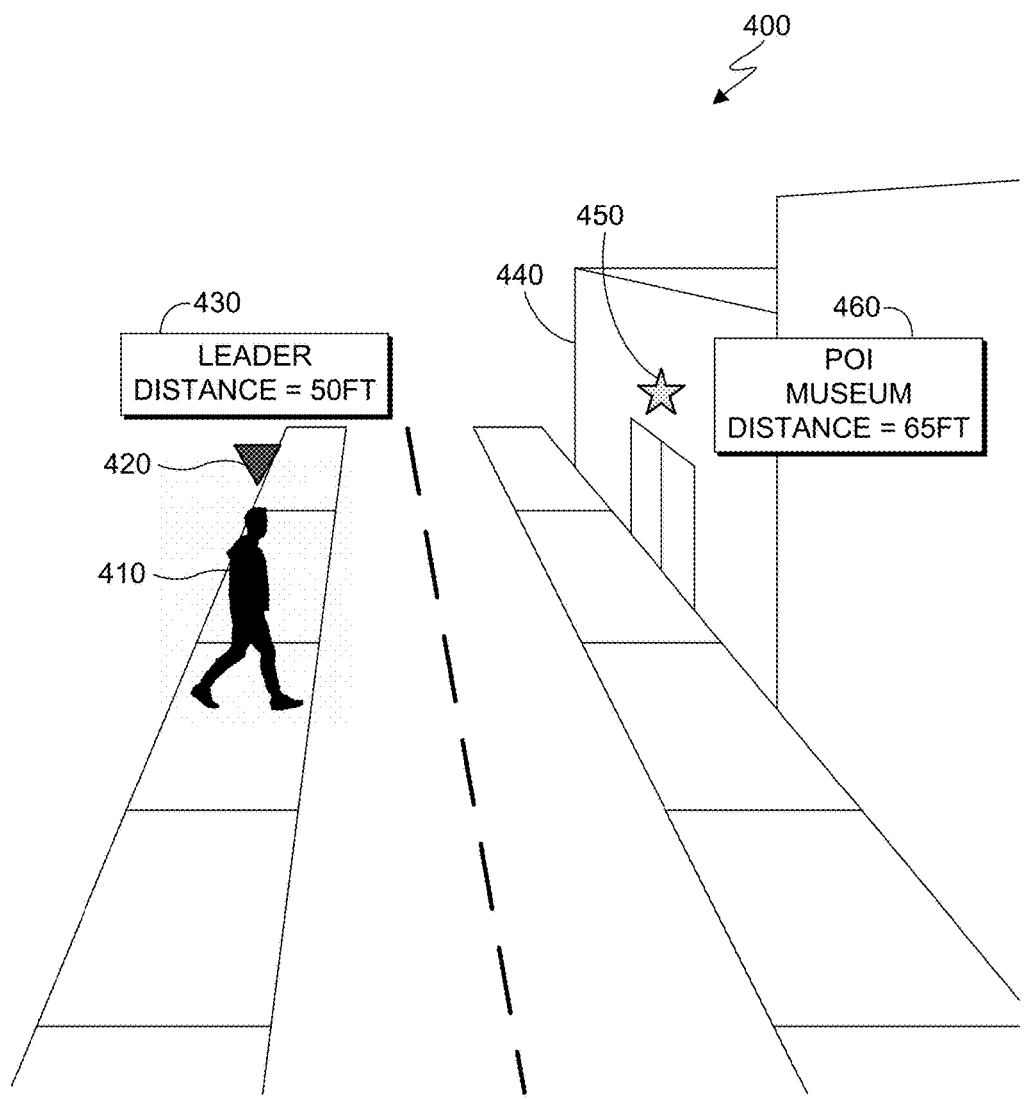
FIG. 4 is a diagram illustrating an exemplary user interface as seen by a user of the second wearable computing device of FIG. 1, in accordance with an embodiment of the invention.

FIG. 4 illustrates a view of an exemplary interface 400 of wearable computing device 130 as viewed by the user of wearable computing device 130 (i.e., the follower), in accordance with an embodiment of the invention. In various embodiments, interface 400 depicted in FIG. 4 illustrates information displayed on a heads-up display where information is overlaid onto the user's field of view of the environment outside of wearable computing device 130. In some embodiments, a camera included within wearable computing device 130 captures the current view of the surroundings of the follower and overlays visual elements onto the view captured by the camera.

The interface depicted in FIG. 4 includes leader 410, leader indicator 420, leader description 430, point of interest (POI) 440, POI indicator 450, and POI description 460.

Leader 410 is the user of wearable computing device 110 ("the leader"), who the user of wearable computing device 130 is currently following, in accordance with an embodiment of the invention. It should be appreciated that in various embodiments, leader 410 appears on the interface of wearable computing device 130 just as they would appear if viewed by the follower.

Leader indicator 420 is a graphical element displayed on the interface above leader 410 to assist in identifying the current location of leader 410, in accordance with an embodiment of the invention. It should be appreciated that any shape of any size or color can be used as leader indicator 420 to represent the current location of leader 410. The embodiment depicted in FIG. 4 were leader indicator 420 is a solid inverted triangle is intended to serve as an example and is not meant to be limiting.

Leader description 430 is a portion of text which identifies information related to leader 410 such as the identity of leader 410 and the distance between the user of wearable computing device 130 and leader 410. In other embodiments, additional information such as the number of followers currently following the leader, an amount of time left in a following session such as a guided tour, or any other information related to the leader may be included in leader description 430.

In one embodiment, the method of calculating the distance between the leader and the follower is computed using the GPS coordinates of each user including a latitude, longitude, and elevation dimension corresponding to the current location of the leader and follower. In other embodiments, the distance between the leader and the follower is determined based only on the latitude and longitude of each user. In general, it is preferable to include the elevation of each user above sea level, because some embodiments require the ability to determine whether the leader is above or below the follower.

In some embodiments, leader description 430 is displayed on a solid white background in order to make the text included in leader description 430 more easily legible. In other embodiments, leader description 430 is displayed without a background or on a transparent background in order to minimize the interference with the user of wearable computing device 130s view of their surrounding area.

Point of interest (POI) 440 is a point of interest which has been identified by leader 410. In the embodiment depicted in FIG. 4, POI 440 is a museum, but in other embodiments POI 440 can be any object or location which the leader identifies to the follower. Examples of objects which can be used as points of interest include landmarks such as statues or monuments, tourist attractions such as museums or buildings, or any other objects which are identified during the process of a follower following a leader such as in a tour. In one embodiment, leader 410 leads a tour of a national park, and over the course of the tour the leader identifies points of interest such as rare trees, plants, or geologic formations.

POI indicator 450 is a graphical element displayed on the interface directly above POI 440 to assist in identifying the location of a POI such as POI 440, in accordance with an embodiment of the invention. Similarly to leader indicator 420, it should be appreciated that any shape of any size or color can be used as POI indicator 450 to identify the location of POI 440. The embodiment depicted in FIG. 4 were POI indicator 450 is a star is intended to serve as an example and is not meant to be limiting.

POI description 460 is a portion of text which identifies important information related to POI 440 such as a description of POI 440 and the distance between the user of wearable computing device 130 and POI 440. In other embodiments, additional information such as the identity of the leader who identified the POI, an image or photograph taken of the POI by the leader, or additional information related to the POI such as a Wikipedia article or search result may be included in POI description 460.

In one embodiment, the method of calculating the distance between the user of wearable computing device 130 and POI 440 is computed using the GPS coordinates of each user including a latitude, longitude, and elevation dimension corresponding to the current location of the user of wearable computing device 130 and POI 440. In other embodiments, the distance between the user of wearable computing device 130 and POI 440 is determined based only on the latitude and longitude of each user. In general, it is preferable to include the elevation of each user above sea level, because some embodiments require the ability to determine whether POI 440 is above or below the follower.

In some embodiments, POI description 460 is displayed on a solid white background in order to make the text included in POI description 460 more easily legible. In other embodiments, POI description 460 is displayed without a background or on a transparent background in order to minimize the interference with the user of wearable computing device 130s view of their surrounding area.

In various embodiments, leader 410 identifies points of interest such as POI 440 by making a gesture such as a pointing gesture. In one embodiment, leader 410 identifies a point of interest by pointing to an object and holding their arm in place until a point of interest is created. In another embodiment, leader 410 identifies a point of interest by pointing to an object with two fingers extended or making a verbal indication such as saying "make a point of interest" while pointing at an object. In another embodiment, leader 410 identifies a point of interest by making a "picture frame" gesture with their hands, where the thumb and pointer finger of each hand is utilized to form a rectangle around a portion of leader 410's field of view. In these embodiments, the direction of the point of interest relative to the leader is determined by the direction in which the leader's arm is pointing, as determined by a device such as an accelerometer or gyroscope included in wearable computing device 110. The distance of the point of interest in the direction the leader's arm is pointing can be determined either by using an optical device such as a laser rangefinder included in wearable computing device 110 or a verbal indication made by the leader such as "make a point of interest 55 feet away".

FIG. 5 depicts the components of computing devices 110 and 130, which is an example of a computing device that include leader management program 120 and follower management program 140 of embodiments of the present invention. Computing devices 110 and 130 include communications fabric 502, which provides communications between dual-core CPU 504, memory 506, persistent storage 508, communications unit 510, input/output (I/O) interface(s) 512, cache 516. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective dual-core CPU(s) 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. In one embodiment, external devices 518 includes a camera, a microphone, a GPS device, and hardware which supports Bluetooth communication. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for initiating a following process between a first wearable computing device and a second wearable computing device, the method comprising:
   identifying, by one or more processors, a first gesture made by a first user of a first wearable computing device;
   sending, by one or more processors, an offer to a second wearable computing device, wherein the offer is to follow the first user;
   receiving, by one or more processors, an indication of an acceptance of the offer from the second wearable computing device, wherein the acceptance of the offer comprises an identified second gesture made by a second user of the second wearable computing device;
   causing the second wearable computing device to follow the first user, wherein causing the second wearable computing device to follow the first user comprises:
      sending, by one or more processors, to the second wearable computing device, information related to, at least, the current location of the first wearable computing device; and
      causing the second wearable computing device to overlay a visual element onto a view of surroundings of the second wearable computing device, based on the information related to, at least, the current location of the first wearable computing device;
   receiving an image, captured via a camera of the first wearable computing device, that includes a face;
   identifying, by one or more processors, that the face corresponds to a third user utilizing a facial recognition technique; and
   determining, by one or more processors, that the third user is included within a list of users who are not permitted to follow the first user.

2. The method of claim 1, further comprising:
   receiving, by one or more processors, a request to send an offer to follow the first user from the second wearable computing device.

3. The method of claim 1, further comprising:
   subsequent to receiving the indication of the acceptance of the offer from the second wearable computing device, receiving, by one or more processors, a confirmation of the acceptance of the offer from the first user.

4. The method of claim 1, wherein the offer includes a request for authentication information and the indication of the acceptance of the offer from the second wearable computing device further includes the authentication information; further comprising:
   determining, by one or more processors, that the received authentication information matches a previously stored authentication information requirement.

5. The method of claim 3, further comprising:
   receiving, by one or more processors, an indication from the first user of acceptance of the portion of authentication information received from the second wearable computing device; and
   wherein the indication from the first user comprises a gesture.

6. The method of claim 1, further comprising:
   identifying, by one or more processors, a third gesture made by the first user of the first wearable computing device;
   determining, by one or more processors, a location of a point of interest, based, at least in part, on the third gesture;
   sending, by one or more processors, at least information related to the location of the point of interest to the second wearable computing device.

7. The method of claim 1, wherein the first wearable computing device and the second wearable computing device each comprise at least one of: a watch, a bracelet, a necklace, a ring, and a pair of glasses.

8. The method of claim 1, wherein causing the second wearable computing device to overlay the visual element onto the view of surroundings of the second wearable computing device comprises:
   causing the second wearable computing device to overlay the visual element onto a heads-up display within a field of view of the second user.

9. The method of claim 1, wherein causing the second wearable computing device to overlay the visual element onto the view of surroundings of the second wearable computing device comprises:
   causing the second wearable computing device to overlay the visual element onto a feed captured by a camera of the second wearable computing device.

* * * * *